(No Model.)

J. H. SCHWONE.
AUTOMATIC BICYCLE TIRE PUMP.

No. 598,748. Patented Feb. 8, 1898.

Witnesses

Inventor
John H. Schwone,
by
John Wedderburn
Attorney

UNITED STATES PATENT OFFICE.

JOHN H. SCHWONE, OF SALAMANCA, NEW YORK.

AUTOMATIC BICYCLE-TIRE PUMP.

SPECIFICATION forming part of Letters Patent No. 598,748, dated February 8, 1898.

Application filed August 3, 1897. Serial No. 646,964. (No model.)

*To all whom it may concern:*

Be it known that I, JOHN H. SCHWONE, a citizen of the United States, residing at Salamanca, in the county of Cattaraugus and State of New York, have invented certain new and useful Improvements in Automatic Bicycle-Tire Pumps; and I do hereby declare the following to be a full, clear, and exact description of the invention, such as will enable others skilled in the art to which it appertains to make and use the same.

This invention has reference to a novel construction in a tire-pump for bicycles and other vehicles, and has for its object to provide a device that can be applied for the purpose of forcing air into a pneumatic tire while the wheel is in motion and which can also be readily applied or removed from the wheel at will.

The invention consists in the features of construction hereinafter fully described and claimed.

Figure 1:
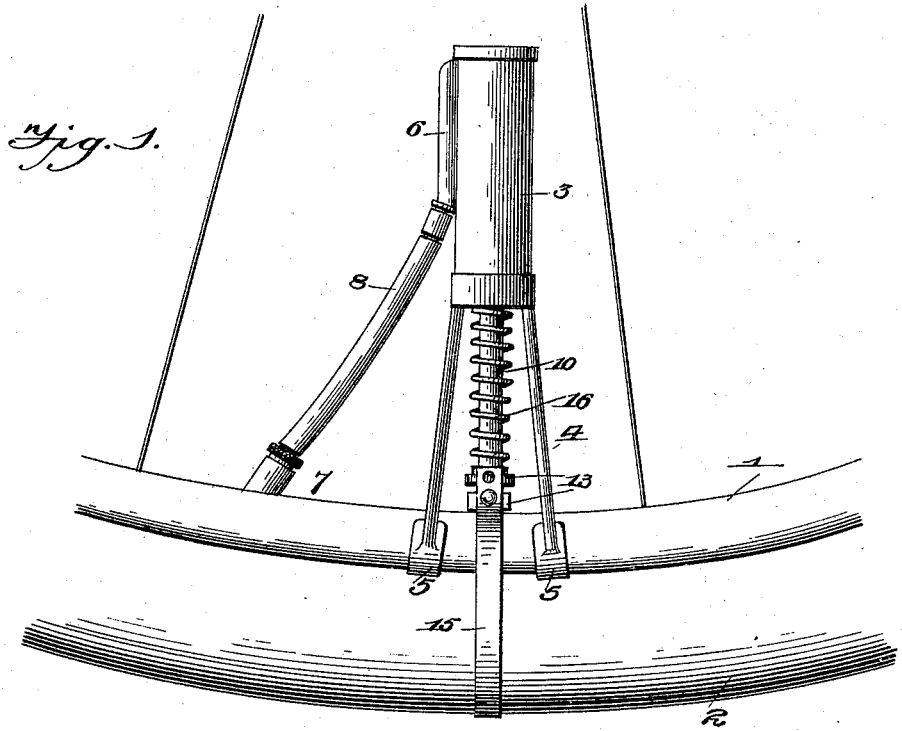
Figure 2:
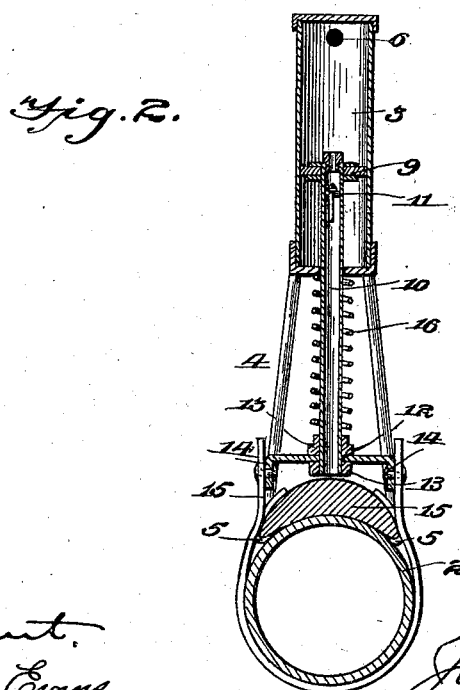

In the accompanying drawings, Figure 1 is a side elevation of a portion of a wheel provided with a pump constructed in accordance with this invention. Fig. 2 is a transverse section of the same.

Referring now to said drawings, 1 indicates the rim of the wheel, and 2 the pneumatic tire. The pump-cylinder is indicated by 3 and is provided on opposite sides with the spring-legs 4, provided with claws 5 at their outer ends, that are adapted to fit around the edge of the rim 1 and to hold said pump in place thereon. From the outer end of the cylinder 3 a pipe 6 extends, and this pipe communicates with the valve-pipe 7 of the pneumatic tire by means of the flexible pipe 8, coupled at its end with said pipes 6 and 7 in a familiar manner. Situated within the cylinder 3 is a piston 9, that is mounted upon the end of a hollow piston-rod 10, having an inwardly-opening check-valve 11. The said piston-rod 11 extends outwardly and is screw-threaded at its outer end and provided with a cross-head 12, that is held between adjusting-nuts 13, that serve to regulate the extent of the stroke of the piston. Said cross-head 12 is provided with bent ends 14, to which are connected the ends of a band 15, that extends around the outer face of the tire. A spring 16 encircles the piston-rod 10 and bears at its opposite ends against the inner adjusting-nut 13 and the head of the cylinder and serves to move the piston-rod and band 15 outwardly.

It is seen from the foregoing description that this air-pump can be quickly placed upon or removed from a wheel and that when in place it serves to inflate the tire, should the same be partially collapsed, by reason of the fact that in riding the piston makes one stroke to every rotation of the wheel, due to the weight of the rider, which is conveyed to the piston-rod through the band 15, which comes in contact with the ground at every revolution of the wheel. When the tire is fully inflated, it is obvious that the piston-strokes will practically cease, but will increase in extent in proportion to the extent to which the tire is collapsed. A device of this kind is especially useful in connection with small punctures, as the rider is enabled to continue riding without mending the same, because the pump is capable of forcing the air into the pneumatic tire in greater quantities than it escapes through the puncture.

The pump can of course be used in various other instances and can be applied or removed, as the case may require, as is obvious.

Having thus described the invention, what is claimed as new is—

In a tire-pump, the combination with a cylinder provided with spring-legs rigidly connected to one end of the cylinder and provided with claws at their outer extremities, of a piston within the cylinder, a hollow piston-rod connected to the piston and extending through the lower head of the cylinder and provided adjacent to the piston with an inwardly-opening check-valve, a cross-head adjustable upon the lower extremity of the piston-rod, a spring-band connected terminally to the opposite sides of the cross-head and designed to encircle a tire, a spring encircling the piston-rod and bearing at its opposite ends against the cross-head and the lower end of the cylinder, and a flexible pipe communicating with the upper end of the cylinder and designed to be coupled to a valve-nipple, substantially as specified.

In testimony whereof I have signed this specification in the presence of two subscribing witnesses.

JOHN H. SCHWONE.

Witnesses:
W. H. METZLER,
E. M. LANGER.